United States Patent Office 2,901,505
Patented Aug. 25, 1959

2,901,505

PROCESS FOR PREPARING GLYCOL ESTERS OF BENZENE DICARBOXYLIC ACIDS

Kenneth E. Kolb, Highland, Ind., assignor to Standard Oil Company, Chicago, Ill., a corporation of Indiana No Drawing. Application November 20, 1957
Serial No. 697,545

6 Claims. (Cl. 260—475)

This invention relates to an improved process for the preparation of hydroxyalkyl esters of aromatic dicarboxylic acids and is particularly directed to a process for the preparation of monomeric esters such as 2-hydroxyethyl terephthalates which are valuable intermediates useful for the preparation of high molecular weight linear polyesters.

The reaction of an aromatic dicarboxylic acid and a glycol leads to the formation of linear polyesters having valuable film and fiber-forming properties. The product of reaction of terephthalic acid and a glycol of the series $HO(CH_2)_nOH$ wherein $n$ is an integer from 2 to 10 is described in U.S. Patent 2,645,319 to Whinfield and Dickson. From a commercial standpoint, the most valuable polymer of this class is polyethylene terephthalate, which is currently prepared by carrying out an ester interchange reaction between ethylene glycol and dimethyl terephthalate to form bis-2-hydroxyethyl terephthalate monomer, which can then be polymerized to polyethylene terephthalate at reduced pressure and at elevated temperatures. Other useful polymeric materials of a similar nature are the products of condensation of ethylene glycol nad mixtures of terephthalic acid and isophthalic acid.

In the past, various attempts have been made to effect direct reaction of ethylene glycol or other glycols with aromatic dicarboxylic acids to produce directly a bis-glycol dicarboxylate suitable for further condensation polymerization to desired linear super polyesters. Such processes have been found to be uneconomical because of the extremely low solubility of the acid, for example terephthalic acid, in the glycol and the extremely low rate of esterification which could be obtained even in the presence of a large excess of glycol reactant. Further, the glycol reactant invariably undergoes some self-condensation during the direct esterification reaction resulting in the formation of ether-glycols which affect the ultimate character of the fibers produced from the polyester.

Linear polyester products such as polyethylene terephthalate are most readily obtained by an ester interchange reaction. This method of production, however, suffers from the inherent disadvantage that the aromatic dicarboxylic acid must first be converted in an initial esterification step to the corresponding dialkyl ester, which in most cases is the dimethyl ester. This ester is then subjected to an ester interchange reaction for formation of the desired intermediate bis-hydroxyethyl dicarboxylate, which is then polymerized to the desired super polyesters. For most efficient operation, the ester interchange reaction must be conducted in the presence of a large molar excess of glycol which must then be separated from the monomeric ester, for example by distillation, and recovered in pure form for recycle to the process. Further, the alcohol, for example methanol, which is obtained as a byproduct of the ester interchange reaction cannot be discarded but must be recovered and recycled to the esterification step in order to effect efficient and economic operation of the overall proceses.

More recently, processes have been developed for the preparation of monomeric glycol terephthalates by the direct reaction of terephthalic acid with ethylene oxide in aqueous alkaline solution at atmospheric or superatmospheric pressure. The process requires pressure equipment and a large excess of ethylene oxide. At atmospheric pressure, over 100% excess ethylene oxide must be used to obtain complete reaction of the terephthalic acid. Much of the ethylene oxide undergoes selfcondensation reaction to form undesired products so that the excess ethylene oxide cannot be recovered and recycled.

An object of the present invention is to provide a process for the preparation of hydroxylalkyl esters of aromatie dicarboxylic acids. A further object is to provide a novel solvent medium for the reaction of an alkylene oxide with aromatic dicarboxylic acids for the preparation of desirable intermediates for the production of linear super-polyesters. Another object is to provide a process for the preparation of beta-hydroxyalkyl esters of aromatic dicarboxylic acids. Another and more specific object of my invention is to provide an economieal process for the preparation of monomeric glycol terephthalates by the direct reaction of ethylene oxide and terephthalic acid in a solvent comprising a di-(lower alkyl) formamide. A particular object of my invention is to provide an improved process for the preparation of bis(beta-hydroxyethyl) terephthalate. These and other objects of my invention will be apparent form the ensuing description thereof.

In the process of the present invention, a solution of an aromatic dicarboxylie acid in a solvent comprising a di-lower alkyl) formamide is contacted with a stoichiometric amount of an alkylene oxide at a temperature of from about 25° C. to about 200° C. to form a reaction product comprising essentially the beta-hydroxyalkyl ester of the dicarboxylic acid. The solvent, for example, N,N-dimethyl formamide is then separated from the reaction product leaving the desired ester in excellent yield. The product can then be easily freed of contaminants by conventional purification methods. Since in this reaction no significant side reactions occur, only stoichiometric amounts of reactants are required and the work up to obtain pure product is much simplified.

The process of the present invention is particularly valuable for the preparation of bis-2-hydroxyethyl terephthalate monomer by the reaction of ethylene oxide with terephthalic acid and the preparation of this ester constitutes a preferred embodiment of my invention. The invention, however, is applicable in general to the preparation of other monomeric glycol dicarboxylates wherein other alkylene oxides are employed as reactants. Such oxides may have from 2 to 8 carbon atoms in the molecule. Various specific oxides include, for example, propylene oxide, butylene oxide, isobutylene oxide, 1,2-epoxy pentane, and the like. The alkylene oxide may have an aromatic substituent, for example, styrene oxide and the like. Other substituents inert to reaction in the system may be present, such as halogen groups as, for example, epichlorohydrin, epibromohydrin and the like.

The process of the present invention may be employed in carrying out the condensation of alkylene oxides with various aromatic dicarboxylic acids. Phthalic acids, particularly terephthalic acid and isophthalic acid may be employed. Mixtures of these acids may be used, for example mixtures of from about 1 to about 10 parts by weight of terephthalic acid to from about 10 to about 1 part of isophthalic acid. Other aromatic dicarboxylic acids having 1 or more alkyl substituents may be employed, for example methyl isophthalic acid (uvitic acid), methyl terephthalic acid, t-butylphthalic acids, diphenyl dicarboxylic acids and the like.

In accordance with the process of my invention, the olefin oxide, for example ethylene oxide is contacted with the aromatic dicarboxylic acid, for example terephthalic acid in a solvent comprising a di-(lower alkyl) formamide. In a preferred embodiment of my invention, dimethyl formamide is utilized as the reaction medium. Other N,N-dialkyl formamides may be employed, for example diethyl formamide, ethylmethyl formamide, di-n-propyl formamide, di-isopropyl formamide, methyl isopropyl formamide and the like. The solvents may be employed in substantially pure form or may be modified by addition thereto of minor proportions, for example from about 2 to about 20% by volume of other solvents miscible therewith, for example, water, methyl alcohol, ethyl alcohol, isopropanol, dioxane, etc. In general, from about 1 to about 20 parts by weight of the formamide solvent are employed per part of aromatic dicarboxylic acid. The amount of solvent is preferably sufficient to completely dissolve the aromatic acid at the temperature of reaction, but lesser amounts of solvent may be employed such that a slurry of the acid in solvent is formed. Larger quantities of solvent may be employed but this may be economically undesirable.

The olefin oxide employed in the reaction may be added to the mixture of acid in dialkyl formamide solvent and the entire mixture heated to reaction temperature or, preferably, the mixture of acid and solvent may be heated to the reaction temperature and the olefin oxide gradually added thereto. In the case of ethylene oxide, which is a gas at ordinary temperature and pressure, the olefin oxide may be bubbled in beneath the surface of the solvent. Liquid oxides may be added in dropwise manner. Solid oxides, for example styrene oxide, may be dissolved in an additional quantity of dialkyl formamide solvent and gradually added to the reaction temperature.

In general, the molecular ratio of reactants is at or near the stoichiometric quantity required to form the beta-hydroxyalkyl carboxylate. Where the monoester of the aromatic acid is desired, about chemically equivalent amounts of alkylene oxide and dicarboxylic acid reactant are employed, desirably in the range of about 0.9 to about 1.2 moles of alkylene oxide per mole of aromatic dicarboxylic acid. In the preparation of bis-esters, a large excess of olefin oxide is avoided since such an excess of reactant does not desirably affect the yield of product but may lead to color formation and production of side products which are difficult to separate and interfere with the recovery of the pure monomeric glycol esters desired. In general, proportions of from about 1.8 to about 2.5 moles of alkylene oxide are employed per mole of aromatic dicarboxylic acid. In the case of ethylene oxide and terephthalic acid a more narrow range is preferred, for example from about 1.8 to about 2.2 moles of ethylene oxide per mole of terephthalic acid. Mixtures of mono- and bis-hydroxyalkyl esters can be obtained by employing alkylene oxide/dicarboxylic acid molar ratios between about 1 and about 2.

The condensation reaction is carried out at a temperature at from about 25° C. to about 200° C., the exact temperature depending upon the particular reactants employed. At elevated temperaures within the prescribed range, partial condensation of the bis(beta-hydroxyalkyl) dicarboxylates initially formed may occur, resulting in formation of low molecular weight neutral polyesters which can be further polymerized to high molecular weight polyesters. For the preparation of bis-beta-hydroxyethyl terephthalate, preferred operating temperatures are in the range of about 75° C. to about 150° C. Preferably, the reaction is conducted at atmospheric pressure. However, in certain instances, it may be desirable to carry out the reactions at pressures greater than atmospheric, particularly where one of the reactants, for example ethylene oxide, is a gas. Where such elevated pressures are employed, they may be in the range from atmospheric to 500 p.s.i.g. or even higher.

It will be realized that time and temperature are interrelated variables, and the period of time required for completion of the reaction will depend to a great extent on the temperature employed. Generally, reaction is essentially complete within from about 0.5 to about 24 hours. At the higher temperatures within the indicated range, from 0.5 to 4 hours may be sufficient.

The process of my invention is preferably conducted in the absence of a catalyst, but catalytic quantities of substances known to promote the condensation of olefin oxides with carboxylic acids may be employed. Minor proportions, for example from about 0.01% to about 5% by weight based on the dicarboxylic acid of a basic or an alkaline reacting salt may be employed such as sodium hydroxide, potassium hydroxide, sodium borate, ammonia, organic amines or the like. Alkali metal salts of organic acids such as sodium acetate, potassium acetate, sodium terephthalate, potassium terephthalate and the like may be employed. The terephthalate salts may be added as such, or may be formed in situ by the addition of alkali metal hydroxide to the reaction mixture containing terephthalic acid.

The preparation of the glycol ester is preferably carried out in the absence of oxygen, generally in an atmosphere of an inert gas such as nitrogen or the like, in order to lessen darkening and to make it possible to obtain a high molecular weight pale or colorless product on polymerization of the glycol ester.

In the practice of my invention, the olefin oxide, for example ethylene oxide, is bubbled into a solution or slurry of the dicarboxylic acid, for example terephthalic acid in dimethyl formamide at the reaction temperature until a quantity substantially equal to the stoichiometric amount necessary for formation of the monomeric glycol terephthalate is added. A small excess of ethylene oxide, for example up to about 20% on a molar basis may desirably be added but a substantial excess should be avoided. The solution is maintained at the reaction temperature for from about 0.5 to about 24 hours until reaction is essentially complete as indicated by the acid number of the solution. The dimethyl formamide solvent is then removed, for example by distillation under reduced pressure and the product recovered as residue. Preferably, the removal of the solvent is effected at relatively low temperatures, for example below 150° C. and preferably below about 100° C. in order to avoid condensation polymerization of the monomeric glycol terephthalate to low molecular weight polymeric substances. The residual ester may be purified by recrystallization from water or from other suitable solvent such as methyl ethyl ketone, toluene or the like. When water is employed as the solvent for recrystallization, I have found that substantially complete removal of the dialkyl formamide solvent, particularly dimethyl formamide, from the residual bis-ester is necessary in order to obtain high yields of the purified product from the recrystallization step, since the bis-ester has a relatively high solubility in aqueous solutions containing minor amounts of dimethyl formamide.

The following examples further illustrate the practice of the present invention but are included for exemplary purposes only and are not to be construed as a limitation thereof.

*Example 1*

A mixture of 50 g. (0.301 moles) of terephthalic acid dissolved in 400 g. of dimethyl formamide was heated with stirring to 100° C. and ethylene oxide bubbled in below the liquid surface for a period of 4 hours until 28–30 gm. (0.635–0.685 mole) of the oxide had been absorbed. The solution was then stirred at 100° C. for another three hours at which time the reaction was over 99% complete as indicated by acid number. The dimethyl formamide was then distilled off under vacuum at a temperature below 100° C., and the residual ester (76 g., 100% yield based on terephthalic acid) purified by dissolving in 250 ml. of hot water and adding enough solid sodium carbonate to adjust the pH to about 8. Upon cooling to room temperature, white crystals precipitated out. The precipitate was filtered, washed several times with cold water and dried to give 67 g. of pure product melting at 107–110° C. (known melting point 107–109° C.) and having a saponification number of 435 (theory 441).

*Example 2*

A mixture of 16.6 g. (0.1 m.) terephthalic acid, 300 ml. (238 g.) of dimethyl formamide and 12.0 g. (0.207 mole) of propylene oxide was prepared at room temperature, and then heated with stirring at 125° C. for 3 hours. At the end of this period, the mixture was essentially neutral (2 ml. required less than 1.0 ml. of 0.1 N KOH). The solvent was removed by distillation under vacuum below 60° C., and the residual light tan solid product weighing 29.6 g. dissolved in 50 ml. of methyl ethyl ketone. The solution was treated with 1 g. of decolorizing charcoal at 100° C., filtered, and the filtrate cooled. An excellent yield of crystalline solid having a melting point of 130–131° C. and a saponification number 386 (theory 397) was obtained.

*Example 3*

The procedure of Example 1 was repeated except that 50 g. (0.301 mole) of isophthalic acid was substituted for the terephthalic acid used therein. A comparable yield of monomeric bis-(2-hydroxyethyl) isophthalate was obtained.

*Example 4*

The procedure of Example 1 was repeated employing molar equivalents of terephthalic acid and ethylene oxide. The reaction product obtained in 50% yield was monohydroxyethyl terephthalate, with only minor amounts of bis-2-hydroxyethyl terephthalate being formed.

In similar manner mixtures of bis-(2-hydroxyethyl) esters of terephthalic acid and isophthalic acid are prepared by reaction of mixtures of acids containing from 0.1 to 10 parts by weight of terephthalic per part of isophthalic acid with stoichiometric quantities of ethylene oxide in dimethyl formamide at temperatures of from about 25° C. to about 200° C.

As illustrated by the above examples, the reaction of olefin oxides with aromatic dicarboxylic acid proceeds rapidly in dialkyl formamide solvent to give high yields of hydroxalkyl esters of aromatic dicarboxylic acids. In the preparation of bis(hydroxyalkyl) esters, the absence of polymeric ether formation is apparent from the fact that the reaction solution is essentially neutral after addition of the theoretical quantity of olefin oxide necessary to form the neutral bis-ester.

The preparation of monomeric glycol terephthalate is usually the first step in the preparation of a polymeric polyethylene terephthalate and the present invention has the advantage over prior art processes of providing the desired monomeric glycol terephthalate readily and in pure form, and uncontaminated by condensation products having undesirable ether linkages formed by side reactions such as self-condensation of ethylene oxide. The glycol esters formed by the present process can be heated, preferably at reduced pressure in the presence of known ester interchange catalysts to yield high molecular weight polyesters suitable for film and fiber formation.

Since it is obvious that various changes may be made in the matter of details without departing from the broad spirit and scope of my invention, it is to be understood that said invention is in no way restricted save as set forth in the following claims.

I claim:
1. A process for the preparation of 2-hydroxyalkyl esters of aromatic dicarboxylic acids which comprises reacting an aromatic dicarboxylic acid selected from the group consisting of isophthalic acid, terephthalic acid and mixtures thereof dissolved in a solvent comprising an N-di-(lower alkyl) formamide with an alkylene oxide having from 2 to 8 carbon atoms in the molecule at a temperature of from about 25° C. to about 200° C. in a mole ratio of from about 1.8 to about 2.5 moles alkylene oxide per mole of aromatic dicarboxylic acid and recovering the 2-hydroxyalkyl ester so formed.

2. A process according to claim 1 wherein said solvent is essentially N,N-dimethyl formamide.

3. A process for the preparation of bis-(2-hydroxyethyl) terephthalate which comprises reacting a solution of terephthalic acid in solvent comprising N,N-dimethyl formamide with ethylene oxide at a temperature of from about 75° C. to about 150° C. and in a mole ratio of from about 1.8 to about 2.5 moles of ethylene oxide per mole of terephthalic acid, heating the resulting mixture for a period of from about 0.5 to about 24 hours at the reaction temperature, and recovering the bis-(2-hydroxyethyl) terephthalate so formed.

4. The process of claim 3 wherein the mole ratio of ethylene oxide to terephthalic acid is from about 1.8:1 to about 2.2:1.

5. A process for the preparation of bis-(2-hydroxyethyl) terephthalate which comprises reacting a solution of terephthalic acid in a solvent consisting essentially of N,N-dimethyl formamide with from about 1.8 to about 2.5 moles of ethylene oxide per mole of telephthalic acid at a temperature of from about 75° C. to about 150° C., removing substantially all of the dimethyl formamide from the resultant solution, dissolving the residue so obtained in water and recrystallizing bis-(2-hydroxyethyl) terephthalate therefrom.

6. A process for the preparation of a mixture of bis-(2-hydroxy ethyl) esters suitable for conversion to high molecular weight polyester resins which comprises reacting in solution a mixture of acids containing from 0.1 to about 10 parts by weight of terephthalic acid per part of isophthalic acid with ethylene oxide in a molar ratio of from about 1.8 to about 2.5 moles of ethylene oxide per mole of dicarboxylic acid, said reaction being effected in a solvent comprising from about 1 to about 20 parts of N,N-dimethyl formamide per part of dicarboxylic acid at a temperature of from about 25° C. to about 200° C., and recovering said mixture of esters therefrom.

References Cited in the file of this patent

UNITED STATES PATENTS

| | | |
|---|---|---|
| 1,883,182 | Webel | Oct. 18, 1932 |
| 2,335,813 | Stein | Nov. 30, 1943 |

FOREIGN PATENTS

| | | |
|---|---|---|
| 140,512 | Australia | Mar. 22, 1951 |
| 1,104,721 | France | June 15, 1955 |

OTHER REFERENCES

Weissberger: "Technique of Organic Chemistry," vol. VII, p. 450 (1955).